United States Patent Office 3,576,015
Patented Apr. 20, 1971

3,576,015
ANTHRAQUINONE DYESTUFFS
Guido R. Genta, Dunnstown, Pa., assignor to American Aniline Products, Inc.
No Drawing. Filed May 8, 1969, Ser. No. 823,183
Int. Cl. C09b 1/56
U.S. Cl. 260—371
4 Claims

ABSTRACT OF THE DISCLOSURE

New anthraquinone dyes, 1,4-diamino-2- (or -3-)thiophenoxy-3 (or -2)chloro - 5 - phenylsulfonamidoanthraquinones, are made from 1,4-diamino-2,3-dichloro-anthraquinone by a sequence of reactions involving bromination in anhydrous aluminum chloride and Ullmann reaction followed by replacement of a chlorine atom with a thiophenoxy group. The new dyes have excellent substantivity, lightfastness and sublimation properties on aromatic polyester fibers.

BACKGROUND OF THE INVENTION

It is known from Altermatt, U.S. 3,164,436, that dyestuffs useful for dyeing of polyester fibers, especially polyethylene terephthalate can be made from anthraquinone dyes having at least one arylmercapto group in the alpha-position of the anthraquinone nucleus. The dyes of Altermatt for the most part, range in color from violet to orange. Using the starting materials of Altermatt, a blue dye of outstanding characteristics is not available.

1,4-diaminothiophenoxyanthraquinones are also known. Certain of these compounds are described in U.S. 2,100,-392 as colors for cellulose acetate. When used to dye polyester fibers, compounds of this class have extremely poor lightfastness and indifferent sublimation properties.

I have discovered a new class of anthraquinone dyes made from 1,4 - diamino-2,3-dichloroanthraquinone. The new dyes when applied to polyester fibers have outstanding substantivity, light, and sublimination characteristics.

SUMMARY OF THE INVENTION

In accordance with the invention, an anthraquinone dye of the following formula:

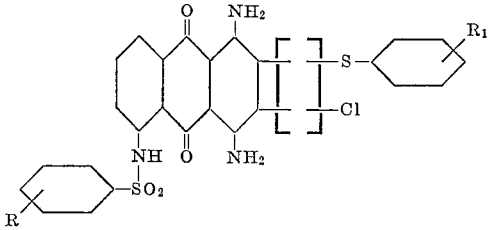

in which R is hydrogen, methyl or chlorine and $R_1$ is hydrogen, lower alkyl, lower alkoxy, or halogen, preferably chlorine or bromine, is provided.

The new class of dyes is made from 1,4-diamino-2,3-dichloroanthroquinone by a series of reactions involving bromination in anhydrous aluminum chloride, an Ullmann reaction to replace the bromine with a sulfonamido group and the replacement of one of the chlorine atoms with a thiophenol.

DETAILED DESCRIPTION

The basic starting material is the well-known and readily available 1,4-diamino - 2,3 - dichloroanthraquinone. The first intermediate:

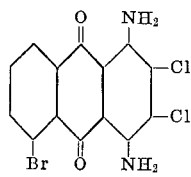

is made by a bromination in a thin fluid melt consisting essentially of anhydrous aluminum chloride or aluminum bromide in admixture with a compound that gives a fluid melt at a low temperature. The preparation of such melts is well established in the dyestuff art and is described, for example, in Genta patent U.S. 2,650,928, issued Sept. 1, 1953. The fluid character of the melt can be achieved by admixing the anhydrous aluminum trihalide with either an alkali metal halide, $SO_2$, urea, or a tertiary base.

If an alkali metal halide is used to provide the fluid melt, it should be present in an amount of one part by weight alkali metal halide to each 5–10 parts by weight aluminum halide. Useful alkali metal halides include sodium chloride, sodium bromide, potassium chloride, potassium bromide, lithium chloride and the like.

From a practical standpoint, I prefer to make the melt by admixing the aluminum trihalide with a tertiary base which is liquid at a temperature ranging from about 80–130° C. Useful tertiary bases include pyridine, α-picoline, quinoline, dimethylaniline, diethylaniline, triethylamine, dimethylformamide, and dimethylacetamide. The use of 0.05–0.5 part by weight of the tertiary base to one part by weight of the aluminum halide will provide a satisfactory melt.

The melt is made by charging the anhydrous aluminum halide, in a quantity sufficient to enable mixing of the reactants, e.g. 1–5 parts by weight, based on the weight of the reactants, to a suitable reactor. An appropriate quantity, of the compound used to thin the melt, for example, the tertiary base, is added to the aluminum halide. The mixture is heated conveniently to a temperature of 120–130° C. to provide a uniform thin fluid melt.

The melt is cooled and 1,4-diamino-2,3-dichloroanthraquinone is added slowly. The melt is then stirred for a time sufficient to disperse the reactant. The bromine is added slowly, conveniently dropwise, to control the exothermicity of the reaction. The temperature of the melt is raised to 80–120° C., preferably 100–110° C. and held for one hour. The brominated intermediate is separated from the melt by drowning the reaction mass in ice water and thoroughly agitating the mixture, preferably in the presence of dilute hydrochloric acid. The brominated compound is separated by filtration, washed acid-free, and excess water is removed therefrom, conveniently by drying at 60–120° C.

The brominated anthraquinone compound is subjected to an Ullmann reaction in which the bromine atom is replaced by an arylsulfonamido group. Conveniently, the reaction is conducted in the presence of a high boiling polar organic solvent; i.e., a solvent having a boiling point of at least 120° C. Useful solvents include n-pentanol, 2 - methoxyethanol, 2 - ethoxyethanol, n-amyl alcohol, 2-ethoxyethyl acetate, diacetone alcohol, ethylene glycol, benzyl alcohol, diethylene glycol, 2-butoxyethanol, tetrahydrothiophene - 1,1 - dioxide, N,N - dimethylformamide, N,N-dimethylacetamide and the like. This same solvent system serves as a reaction medium for the subsequent reaction with the thiophenol.

The 5-bromo-2,3-dichloro-1,4-diaminoanthraquinone is added to the solvent in a suitable reactor and the arylsulfonamide, is added thereto. The reaction is run by heating in the presence of an acid acceptor or acid-binding agent, such as an alkali metal carbonate, bicarbonate or acetate. The efficiency of the reaction is improved by the presence of a copper catalyst, such as copper sulfate or copper acetate. The reaction mixture is heated to an elevated temperature between about 120° C. and the boiling point of the solvent and held at that temperature until the reaction is complete, which generally requires 10–20 hours.

The reaction mixture is then cooled and the thiophenol is charged. Useful thiophenols include thiophenol; p-chlorothiophenol; p-bromothiophenol; p-methoxythiophenol; and p-ethoxythiophenol and the like.

The reaction with the thiophenol is also carried out in the presence of a halogen acceptor, preferably an alkali metal hydroxide, an alkali metal carbonate, or alkali metal acetate. Useful halogen acceptors include potassium hydroxide, sodium hydroxide, sodium carbonate, potassium carbonate, sodium acetate, and the like. At least one equivalent of halogen acceptor is required for each mole of thiophenol present.

The final reaction generally takes from 5–10 hours. After the reaction is complete, the mixture is allowed to cool to 30–60° C. with agitation. The product is separated by filtration, and, if desired, washed with alcohol, water or both.

The dyestuffs made by the method of the invention are applied to aromatic polyester fibers in the form of a dispersed color powder or paste, which is obtained by wet milling, in a conventional apparatus such as a ball mill, the dye, a dispersant such as sodium lignin sulfonate and a wetting agent. The dispersed cake or paste thus obtained can be dried, if desired at 70–80° C. and thereafter micropulverized. Sufficient dispersant is added to give a dispersed powder containing generally between 40–50 percent by weight active dyestuff base.

The dispersed powder, when added to water with or without auxiliary agents, forms a near colloidal aqueous dispersion from which the aromatic polyester fiber or goods is dyed in the conventional manner to give a fiber containing from 0.01–2 percent dyestuff.

The new dyes also give good colors for cellulose triacetate.

My invention is further illustrated by the following examples:

EXAMPLE I

A one-liter flask, equipped with heater, stirrer, and thermometer, was charged with 320 g. of anhydrous aluminum chloride. There was then added portion-wise 80 g. of N,N-dimethylacetamide while maintaining the temperature below 120–130° C. A 46 g. quantity of 1,4-diamino-2,3-dichloroanthraquinone was added after cooling the thin fluid melt to about 55° C. The melt was stirred for another half hour and a 30 g. quantity of bromine was added dropwise. The mixture was heated slowly to 100–110° C. and held at this temperature for a one-hour period. The melt was then poured into 2200 g. of ice water containing 100 g. of 20° Baumé hydrochloric acid. Using live steam the diluted mass was heated to 95–100° C., then filtered, washed acid free, and dried to give 58 g. of brominated intermediate corresponding to 100% of theory.

To a one-liter flask, there was charged 450 g. of n-pentanol (B.P. 138° C.); 58 g. 5-bromo-2,3-dichloro-1,4-diaminoanthraquinone; 28 g. p-toluenesulfonamide; 24 g. sodium acetate anhydrous; and 0.75 g. copper acetate. The mixture was heated to 136–137° C. and was held for 12 hours at this temperature. Some of the acetic acid formed during the reaction was distilled off.

The reaction mixture was cooled and to it were added 10 g. potassium hydroxide flakes and 18 g. of thiophenol. The mass was heated to 136–137° C. and held at this temperature for six hours. After cooling to 35–40° C., the mass was filtered. The separated cake was washed with hot water until the washings were neutral and colorless. There was thus obtained 150 g. of wet cake at 41% by weight, corresponding to 62 g. of pure color.

The dye was made into a paste at 15% color content by ball milling in the presence of water and 20% by weight sodium lignin sulfonate, available commercially as Marasperse N–22. There was thus obtained 415 g. paste. The dispersed dyestuff colored polyester fiber in clear bright blue shades of excellent fastness to light and sublimation.

EXAMPLES II–X

By following the procedure of Example I with appropriate substitution of reactants, the following dyestuffs are obtained:

| Example No. | R | R₁ | Color |
|---|---|---|---|
| II | H | H | Blue. |
| III | Cl | H | Do. |
| IV | H | Cl | Do. |
| V | CH₃ | Br | Do. |
| VI | Cl | Cl | Do. |
| VII | CH₃ | OCH₃ | Do. |
| VIII | H | OCH₃ | Do. |
| IX | Cl | OCH₃ | Do. |
| X | Cl | CH₃ | Do. |

What is claimed is:
1. An anthraquinone dye of the formula:

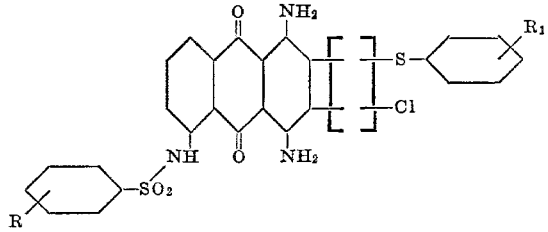

wherein R is a member selected from the group consisting of hydrogen, chlorine, and methyl, and R₁ is a member selected from the group consisting of hydrogen, lower alkyl, lower alkoxy, chlorine and bromine.

2. A dye of claim 1 wherein R is methyl and R₁ is hydrogen.

3. A dye of claim 1 wherein R is methyl and R₁ is chlorine.

4. A dye of claim 1 wherein R and R₁ are hydrogen.

References Cited

UNITED STATES PATENTS 3,486,837   12/1969   Neeff et al. ......... 260—371

LEWIS GOTTS, Primary Examiner

E. J. SKELLY, Assistant Examiner

U.S. Cl. X.R.

8—39, 40